United States Patent [19]
Mascia et al.

[11] 4,136,772
[45] Jan. 30, 1979

[54] REUSABLE CAN CARRIER

[75] Inventors: Carmen T. Mascia, Clarendon Hills; Gary K. Hasegawa, Chicago, both of Ill.

[73] Assignee: The Continental Group, Inc., New York, N.Y.

[21] Appl. No.: 831,979

[22] Filed: Sep. 9, 1977

[51] Int. Cl.² .................... B65D 85/62; B65D 71/00
[52] U.S. Cl. ................................ 206/199; 206/427; 224/45 R; 294/87.2
[58] Field of Search ............... 206/199, 151, 150, 161, 206/427; 294/87.2; 224/45

[56] References Cited
U.S. PATENT DOCUMENTS

| | | | |
|---|---|---|---|
| 2,874,835 | 2/1959 | Poupitch | 206/150 |
| 3,387,702 | 6/1968 | Reynolds et al. | 220/67 |
| 3,633,962 | 1/1972 | Erickson | 294/87.2 |

*Primary Examiner*—William T. Dixson, Jr.
*Attorney, Agent, or Firm*—Charles E. Brown

[57] ABSTRACT

A reusable carrier for cans which comprises a thin sheet of resilient plastics material with can-receiving frusto-conical openings having wide bottom ends and narrow upper ends permitting machine application of the carrier onto the cans by a single press-on operation.

15 Claims, 5 Drawing Figures

U.S. Patent      Jan. 30, 1979      4,136,772
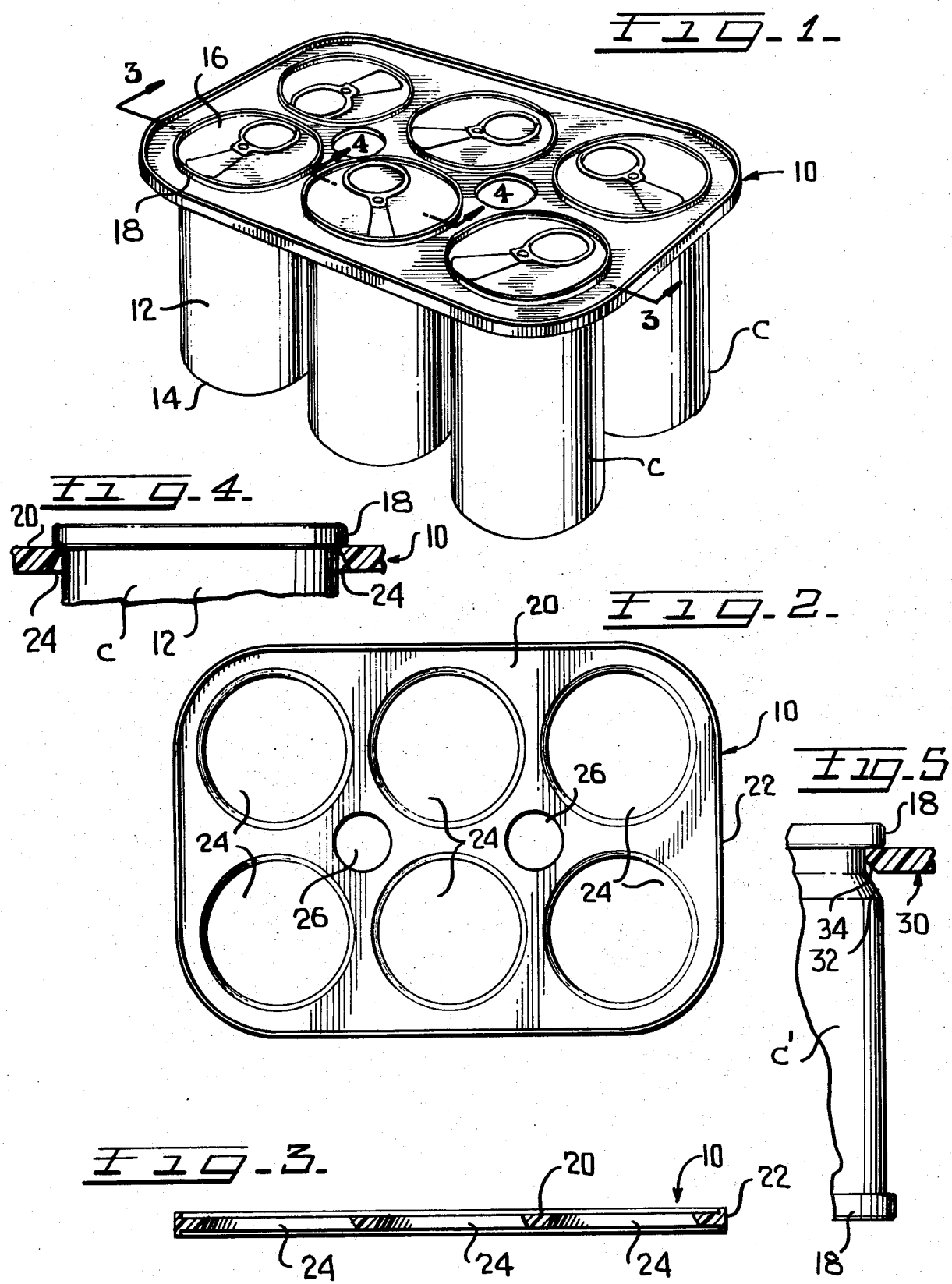

REUSABLE CAN CARRIER

This invention relates in general to new and useful improvements in container packages, and more particularly to a reusable can carrier.

At the present, beverage cans and the like are normally packaged in suitable packs of six and eight cans with the packages being designed solely for the purpose of conveying the cans to the ultimate user. When the cans are removed from the package, the carrier or wrapping is destroyed so that it no longer remains available for the return of the cans should it be so desired. At the present, it is propose in certain areas to place a penalty or tax on the sale of cans so that it is desirable that the empty cans be returnable. Thus, it is proposed to provide a can carrier which is reusable not only for the return of the empty cans, but also for the sale of filled other cans and the return thereof.

In accordance with this invention, there is provided a reusable carrier for cans in the form of a sheet of resilient plastics material, the sheet having a preselected number of openings therethrough with each of the openings being frusto-conical in transverse section and having a wide bottom dimension and a narrow upper dimension forming means for facilitating the forced passage of an enlarged end portion of a can through the opening. Such a can carrier would be constructed so that it could be applied simultaneously to a plurality of cans by suitable machinery and at the same time while the cans are firmly held in the carrier, they can be individually removed, the contents thereof dispensed, and then replaced in the carrier for transmittal back to the source of origin.

With the above, and other objects in view that will hereinafter appear, the nature of the invention will be more clearly understood by reference to the following detailed description, the appended claims and the several views illustrated in the accompanying drawings.

IN THE DRAWINGS:

FIG. 1 is a top perspective view showing the can carrier having cans packaged therein for ease of handling.

FIG. 2 is a bottom plan view of the can carrier of FIG. 1 and shows the general details thereof.

FIG. 3 is a transverse vertical sectional view taken along the line 3—3 of FIG. 1 and shows the general cross section of the can carrier, the cans being omitted.

FIG. 4 is an enlarged fragmentary transverse vertical sectional view taken along the line 4—4 of FIG. 1 and shows the specific mounting of a can within the carrier.

FIG. 5 is a sectional view through a modification.

Referring now to the drawings in detail, it will be seen that there is illustrated in FIG. 1 a six-pack which includes a can carrier formed in accordance with this invention and generally identified by the numeral 10. The can carrier carries six cans C. It is to be understood that the number of cans may vary and that the illustrated invention has been illustrated in conjunction with a six pack only and that it is the most conventional package of beverage cans.

It is to be understood that the cans C may vary in construction, but the principles of the can carrier 10 may be applied to all types of conventional cans. The illustrated cans are three piece cans including a body 12, a lower end unit secured in place by a conventional double seam 14, and an upper end unit 16 secured to the body 12 by a conventional double seam 18. Further, the end unit 16 is illustrated as being of the easy opening type.

The can carrier 10 is formed from a sheet 20 of plastics material and is provided with a peripheral reinforcing rim 22, which, as best shown in FIG. 3, projects both above and below the surfaces of the sheet although the flange could be restricted to one surface of the sheet.

The sheet 20 has formed therein a plurality of openings 24 each of a size for receiving one of the cans C. In the illustrated form of carrier 10, the openings 24 are six in number and are arranged in rows and columns. However, the arrangement of the openings 24 may vary depending upon the particular package desired.

As is clearly shown in FIGS. 3 and 4, each opening 24 is frusto-conical in transverse section and has a narrow upper dimension and a wide bottom dimension. Preferably the narrow upper dimension of each opening 24 approximates the external diameter of the body 12 adjacent the double seam 18. In a like manner, in order to facilitate the forcing of the double seam 18 through the sheet 20, the wide bottom dimension approximates the external dimension of the double seam 18 or any other projection provided on the can C for the purpose of retaining it within the carrier 10.

It will be readily apparent that when the cans C are placed in the orientation and spacing of the openings 24, a carrier 10 may be dropped into overlying relation to a group of cans C and then a machine may press the carrier 10 down over the tops of the cans so that the sheet 20 engages beneath the double seams 18 in the manner illustrated in FIG. 4.

In order to facilitate the carrying of the can package, the carrier 10 is preferably provided with finger receiving openings 26 which in the illustrated form of the invention are disposed between the rows and columns of openings 24.

In practice it has been found that when the sheet is provided with a thickness on the order of 3/32 inch to ⅛ inch, a most economical carrier may be formed. It will be apparent that if the sheet is too thin, it will not have sufficient strength to withstand the weight of the cans and the repeated application and removal. On the other hand, if the sheet 20 is too thick, the cost of the carrier 10 will be excessive and, therefore, not economically feasible.

It is to be understood that the fit between the cans C and the carrier 10 will be such that when it is desired to dispense the contents of one of the cans C it may be removed from the carrier 10 by a twisting action which will in no way damage either the carrier or the can. When it is desired to replace an empty can, it is merely placed thereunder the carrier and the carrier forced down thereover in the same manner as the carrier is initially applied to a plurality of cans.

It is intended that the carrier 10 be repeatedly reused. In the normal use thereof, filled cans will be packaged therein in the manner illustrated in FIG. 1. Then as the cans have their contents dispensed in the normal manner, they are replaced within the carrier so that the empty six-pack may be returned to the retail store. The empty six-pack may then be transmitted to the collector of the empty cans with the carrier 10 being separated therefrom and being reusable by the packager.

Referring now to FIG. 5 in particular, it will be seen that there is illustrated a slightly modified form of can carrier, generally identified by the numeral 30. The can carrier 30 is particularly constructed to be associated with a can C' of the type having a body with a necked end portion 32 adjacent the usual seam 18 which secures the end unit to the body.

The can carrier 30 differs from the can carrier 10 only in that each opening 34 thereof is of a different cross section. It is to be noted that, like the opening 24, each opening in the can carrier 30 tapers inwardly and upwardly so as to have a lower bottom portion of a large diameter and an upper portion of a lesser diameter. However, instead of the lesser diameter cross section of the opening 34 being at the extreme top of the sheet portion of the can carrier, the portion of lesser diameter is intermediate the upper and lower surfaces of the can carrier 30 and each opening 34 flares upwardly and outwardly above the part of lesser diameter. The diameter of each opening 34 at the top of the can carrier is subatantially the same as that at the bottom.

Although the can carrier 10 may be utilized in conjuntion with both two-piece cans and three-piece cans, it is to be noted that the illustrated cans C are of the two-piece type and do not have a lower seam. Thus, if desired, the cans may be withdrawn from the can carrier 10 by merely pulling them through the openings 24. On the other hand, when the can bodies are of the necked-in type as shown in FIG. 5 with respect to the cans C', the cans must be removed from the can carrier 30 by pulling them down through the openings 34. It is because of this that each opening 34 has a double taper as described above.

At this time it is particularly pointed out that the cans C may equally well be of three-piece construction, as shown in FIG. 5 or the cans C' may be of a two-piece construction in accordance with the general illustration of FIG. 1.

Although only two preferred embodiments of the can carrier have been specifically illustrated and described herein, it is to be understood that minor variations may be made in the can carrier without departing from the spirit or the scope of the invention, as defined by the appended claims.

What is claimed as new is:

1. A new article of manufacture comprising a reusable carrier for cans, said reusable carrier being in the form of a substantially thick sheet of resilient plastics material, said sheet having a preselected number of openings therethrough, each of said openings being of the same depth as the thickness of said sheet, each of said openings being frusto-conical in transverse section and having a wide dimension for facilitating the forced passage of an enlarged end portion of a can through said opening and a narrow dimension cooperating with a portion of said sheet to engagably retain an intended can.

2. The article of claim 1 wherein said narrow dimension approximates the external dimension of a body of an intended can below the enlarged end portion thereof.

3. The article of claim 2 wherein said wide dimension approximates the external dimension of an enlarged end portion of an intended can.

4. The article of claim 1 wherein said sheet has a thickness on the order of 3/32 inch to ⅛ inch.

5. The article of claim 1 wherein said openings are arranged in rows and columns.

6. The article of claim 1 wherein said openings are arranged in rows and columns, there are at least three rows, and there are at least two finger recessing openings between said columns of openings.

7. The article of claim 1 wherein each opening flares outwardly from said narrow dimension to said sheet portion.

8. The article of claim 1 wherein said sheet has a peripheral reinforcing flange.

9. The article of claim 1 wherein said narrow dimension and said portion lie in the same plane forming a lip upon which the enlarged end portion of an intended can will be retained.

10. A returnable can pack comprising a plurality of cans each having a continuous radial projection adjacent one end, and a reusable carrier, said carrier being in the form of a substantially thick sheet of resilient plastics material, said sheet having can receiving openings therethrough receiving said cans, each of said openings being of the same depth as the thickness of said sheet, each of said can receiving openings being frusto-conical in transverse section with a portion of said sheet underlying said can projections, each opening having a wide bottom dimension and a narrow upper dimension with said narrow dimension cooperating with said portion to engagably retain an intended can therefrom.

11. The returnable can pack of claim 10 wherein said narrow upper dimension conforming generally to the dimension of a respective can below the projection thereof.

12. The returnable can pack of claim 10 wherein said sheet is substantially planar.

13. The returnable can pack of claim 10 wherein said cans each has a second continuous radial projection adjacent the opposite end thereof.

14. The returnable can pack of claim 10 wherein each opening flares upwardly and outwardly from said narrow upper dimension to said portion.

15. The returnable can pack of claim 10 wherein each opening flares upwardly and outwardly from said narrow upper dimension to said portion, and each can is of the type having a terminal seam and a necked-in body portion adjacent said seam defining said projection.

* * * * *